US012546268B1

(12) United States Patent
Sari et al.

(10) Patent No.: US 12,546,268 B1
(45) Date of Patent: Feb. 10, 2026

(54) METHODOLOGY TO ENABLE EFFICIENT FLEX FUEL OPERATION WITH NATURAL GAS, HYDROGEN, AND THEIR BLENDS

(71) Applicant: SAUDI ARABIAN OIL COMPANY, Dhahran (SA)

(72) Inventors: Rafael Lago Sari, Commerce Township, MI (US); Ashish Dinesh Shah, Canton, MI (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 18/895,622

(22) Filed: Sep. 25, 2024

(51) Int. Cl.
| | |
|---|---|
| *F02D 41/14* | (2006.01) |
| *F02D 19/02* | (2006.01) |
| *F02D 41/00* | (2006.01) |
| *F02M 21/02* | (2006.01) |

(52) U.S. Cl.
CPC ....... *F02D 41/1454* (2013.01); *F02D 19/029* (2013.01); *F02D 41/0027* (2013.01); *F02M 21/0215* (2013.01)

(58) Field of Classification Search
CPC ............... F02D 41/0027; F02D 19/029; F02D 41/1454; F02M 21/0215
See application file for complete search history.

(56) References Cited

U.S. PATENT DOCUMENTS

| | | |
|---|---|---|
| 6,983,730 B2 | 1/2006 | Kuzuyama |
| 8,469,009 B2 | 6/2013 | Munshi et al. |
| 11,428,186 B2 | 8/2022 | Blumreiter et al. |
| 2002/0029770 A1 | 3/2002 | Heffel et al. |

(Continued)

FOREIGN PATENT DOCUMENTS

| | | |
|---|---|---|
| DE | 102004016159 A1 | 11/2005 |
| EP | 0787250 B1 | 4/2003 |

(Continued)

OTHER PUBLICATIONS

J.R. Anstrom, et al., "Blended hydrogen-natural gas-fueled internal combustion engines and fueling infrastructure," Compendium of Hydrogen Energy, 2016 (14 pages).

(Continued)

*Primary Examiner* — Kevin A Lathers
(74) *Attorney, Agent, or Firm* — Osha Bergman Watanabe & Burton LLP

(57) ABSTRACT

Systems and methods to enable efficient flex fuel operation with fuel blends including natural gas and hydrogen. The system includes a fuel storage system fluidly connected to an engine, the engine having an air handling system connected to a downstream side of the engine by a main exhaust passage, and an oxygen sensor interfacing with the main exhaust passage. The system also includes a controller configured to perform methods including performing a fuel identification routine to determine a composition of fuel blend at startup of the engine, determining target operating conditions corresponding to the composition of the fuel blend for operation of the engine, use the oxygen sensor to measure a residual oxygen concentration in an exhaust gas stream, calculate an operating air-fuel ratio, and adjust engine operating conditions until the operating air-fuel ratio equals the target air-fuel ratio.

11 Claims, 9 Drawing Sheets

(56) References Cited

U.S. PATENT DOCUMENTS

2016/0108862 A1    4/2016   Siuchta et al.
2023/0407807 A1*  12/2023   Dou ..................... F02D 19/087

FOREIGN PATENT DOCUMENTS

EP      1559886 B1      6/2012
WO    2023225693 A1    11/2023

OTHER PUBLICATIONS

Onoranti, et al., "The role of hydrogen for future internal combustion engines," International Journal of Engine Research, 2022 (12 pages).

K. Wróbel, et al., "Hydrogen Internal Combusion Engine Vehicles: A Review," Energies, 2022 (13 pages).

Koch, D.T. et al., H2-Engine Operation with EGR Achieving High Power and High Efficiency Emission-Free Combustion, SAE International, JSAE 20199287, SAE 2019-01-2178, pp. 1-12, 2019, retrieved Aug. 20, 2025 (12 pages).

Walter, L. et al., "The H2 Combustion Engine—The Forerunner of a Zero Emissions Future Der H2," 42nd International Vienna Motor Symposium, pp. 1-22, Apr. 29-30, 2021 (22 pages).

Sens, M. et al., "Hydrogen Powertrains in Competition to Fossil Fuel Based Internal Combustion Engines and Battery Electric Powertrains," 42nd International Vienna Motor Symposium, pp. 1-79, Apr. 29-30, 2021 (79 pages).

Jincheng, L. et al., "FAW High-Efficiency Zero-Emission Miller Cycle Hydrogen Internal Combustion Engine for Carbon Neutrality," 43rd International Vienna Motor Symposium, pp. 1-21, Apr. 27-29, 2022 (21 pages).

Korn, T. et al., "The new highly efficient hydrogen internal combustion engine as ideal powertrain for the heavy-duty sector," Internationaler Motorenkongress, Springer Nature, pp. 1-16, 2019 (16 pages) https://doi.org/10.1007/978-3-658-26528-1_23.

Kapus, P. et al., "High Efficiency Hydrogen Internal Combustion Engine—Carbon Free Powertrain for Passenger Car Hybrids and Commercial Vehicles," 43rd International Vienna Motor Symposium, pp. 1-21, Apr. 27-29, 2022 (21 pages).

* cited by examiner

US 12,546,268 B1

METHODOLOGY TO ENABLE EFFICIENT FLEX FUEL OPERATION WITH NATURAL GAS, HYDROGEN, AND THEIR BLENDS

BACKGROUND

Traditional fuel sources, such as gasoline and diesel, are well known contributors of greenhouse gases. In recent years, legislation requirements are driving the introduction of technologies to replace said fuel sources with "cleaner" and/or renewable options, in an effort to drastically reduce carbon dioxide ($CO_2$) emissions in the transportation industry.

Alternative fuel sources such as propane, natural gas, electric hybrids, hydrogen engines and fuel cells, and bio-diesel may be viable replacements for gasoline and diesel. Feasibility for gasoline replacement depends on many complex factors including cost, fuel distribution, emissions, vehicle systems analysis, energy storage, power and propulsion systems, and advanced power electronics. Issues with alternative fuel integration include cost, time, and complexity of designing new engine hardware to efficiently process alternative fuels. Electric, hybrid, and hydrogen fuel cell vehicles are all significantly more expensive than traditional internal combustion engine vehicles. Accordingly, there exists a need for methods and systems to effectively convert cost-effective, readily available, and environmentally friendly fuel sources to power in the transportation industry.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a system including a fuel storage system fluidly connected to an engine by a main fuel line. The system also includes an air handling system fluidly connected to a downstream side of the engine by a main exhaust passage, a main intake passage fluidly connected to an upstream side of the engine and an oxygen sensor interfacing with the main exhaust passage. The system also includes a controller electrically coupled to the engine and the oxygen sensor, the controller including a processor and a memory, the memory storing instructions that, when executed by the processor, cause the processor to perform a fuel identification routine to determine a composition of a fuel blend in the fuel storage system at startup of the engine, where the fuel blend includes an amount of hydrogen and an amount of natural gas, determining, using a fuel-engine relationship, target operating conditions corresponding to the composition of the fuel blend for operation of the engine, where the target operating conditions include a target air-fuel ratio; use the oxygen sensor to measure a residual oxygen concentration in an exhaust gas stream in the main exhaust passage, calculate, from the residual oxygen concentration, an operating air-fuel ratio, and adjust one or more engine operating conditions until the operating air-fuel ratio equals the target air-fuel ratio.

In another aspect, embodiments disclosed herein relate to a method, including performing a fuel identification routine to determine a composition of a fuel blend at startup of an engine, where the fuel blend includes an amount of hydrogen and an amount of natural gas, and determining, using a fuel-engine relationship, target operating conditions corresponding to the composition of the fuel blend for operation of the engine, where the target operating conditions includes a target air-fuel ratio. The method also includes measuring, using an oxygen sensor disposed on a main exhaust passage of the engine, a residual oxygen concentration in an exhaust gas stream, calculating, from the residual oxygen concentration, an operating air-fuel ratio, and adjusting one or more engine operating conditions, using a controller, until the operating air-fuel ratio equals the target air-fuel ratio.

Any combinations of the various embodiments and implementations disclosed herein can be used in a further embodiment, consistent with the disclosure. Other aspects and advantages of the claimed subject matter will be apparent from the following description and the appended claims.

DETAILED DESCRIPTION

Figure 1:
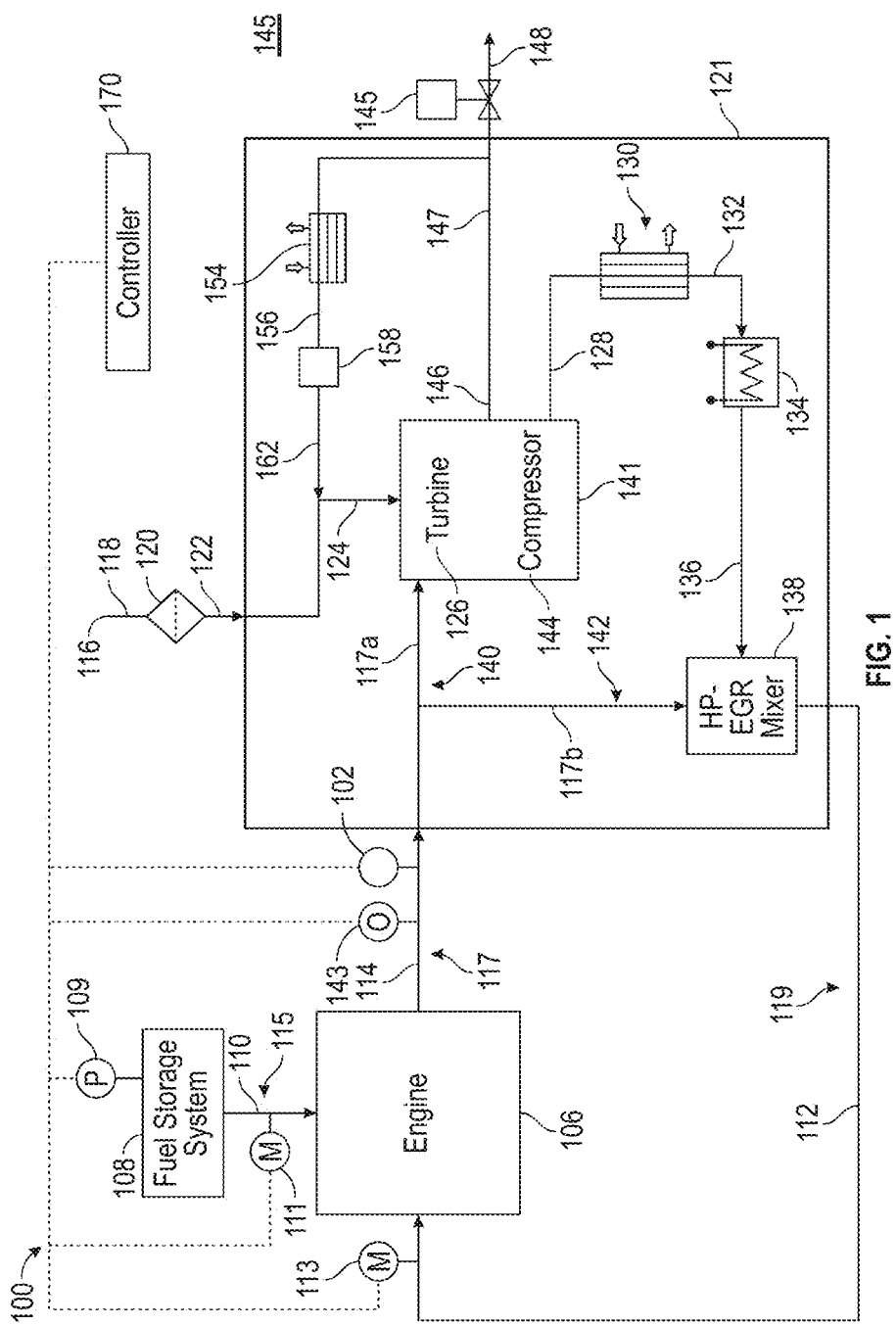
FIG. 1 is an overall system for flex fuel engine operation according to one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Hydrogen fuel may be one of the most cost-effective solutions for a carbon-less fuel source which may be used in internal combustion engines (ICEs), especially for long-haul heavy-duty transportation. The carbon-less nature of neat hydrogen gas (no carbon), in combination with the low cost, mature technology and established manufacturing operations for internal combustion engines makes hydrogen gas a viable alternative to traditional hydrocarbon fuels. However, infrastructure to effectively provide hydrogen fuel to vehicles is currently not sufficiently in place given the relatively limited number of refueling stations.

Another viable replacement for traditional fuels, such as gasoline and diesel, is natural gas. Natural gas may also be used in ICEs and has a much more developed fueling infrastructure compared to hydrogen gas, with pipelines and fueling stations already in place. Therefore, because hydrogen and natural gas fuels may both run in ICEs, and in order to obtain the benefits of both as outlined above, it is desirable to develop an engine system and operating methods to power an ICE using either hydrogen or natural gas or a blend of the two.

An engine designed to run on more than one type of fuel source may be referred to as a "flexible fuel" or "flex fuel" engine. While the term flexible, or flex, fuel may refer to any one or more fuel type, flex fuel engines described herein are described as being operated with hydrogen, natural gas, or a blend of hydrogen and natural gas flex fuels.

When a fuel-air mixture ignites in an ICE, a flame front begins to propagate through the mixture, initiating the combustion process. The laminar flame speed refers to the velocity at which this flame front travels through the unburned fuel-air mixture when there is no significant turbulence affecting its propagation. Higher laminar flame speeds generally result in more efficient combustion and faster energy release within an engine. Thus, laminar flame speed may be used as a factor indicating the efficiency of the combustion process and the performance of internal combustion engines.

Laminar flame speed is dependent on a specific fuel being burned. Systems and methods disclosed herein advantageously leverage control of an air-fuel ratio in an engine to influence the laminar flame speed of different fuel blends. In contrast, conventional engines, which are designed for operation consistently with the same type of fuel, do not take differences in laminar flame speed for different types of fuels into account when designing and/or operating the engines.

The laminar flame speed may be influenced by several factors, including the chemical properties of the fuel, the air-fuel ratio, temperature, pressure, and the presence of additives or contaminants in the fuel mixture. Embodiments of the present disclosure include using the air-fuel ratio as a lever to enable flex fuel operation in an ICE with natural gas and hydrogen fuel, without relying on hardware modifications.

Control of the air-fuel ratio to influence the laminar flame speed may be discussed herein using the mixture's "equivalence ratio" (φ), which refers to the ratio of the stoichiometric air-fuel ratio required for complete combustion in the combustion chamber to the actual (i.e., operating) air-fuel mixture ($AF_{op}$) ratio used in a combustion chamber compared. The stoichiometric air-fuel ratio is the ideal ratio at which fuel completely burns with the available oxygen in the air without excess or deficiency. An equivalence ratio of 1 indicates a stoichiometric air-fuel mixture is used; an equivalence ratio of less than 1.0 indicates a lean air-fuel mixture (excess air compared to the ideal ratio); and an equivalence ratio of greater than 1.0 indicates a rich air-fuel mixture (excess fuel compared to the ideal ratio).

The air-fuel and equivalence ratios φ may be defined by the following mathematical equations:

$$AF = \text{mass of air:mass of fuel} \quad \text{(Equation 1)}$$

$$\frac{1}{\varphi} = \frac{AF_{op}}{AF_{Stoich}} \text{ or, } \varphi = \frac{AF_{stoich}}{AF_{op}} \quad \text{(Equation 2)}$$

where φ is the equivalence ratio, AF is an air to fuel ratio, $AF_{op}$ is an operating air-fuel ratio, and $AF_{Stoich}$ is a stoichiometric air-fuel ratio. From the flowrates of air and fuel, the amount of air and fuel (e.g., by volume or mass) delivered into an engine's combustion chamber may be calculated over a given time.

The term "lambda" (λ) refers to the inverse of the equivalence ratio. In some instances, "lambda" may be used with gasoline engines, while "equivalence ratio" may be used to characterize various types of fuel mixtures, such as natural gas and hydrogen, as well as others. For gasoline, the stoichiometric air-fuel ratio is around 14.7:1, meaning 14.7 parts of air to 1 part of fuel by mass for complete combustion. For natural gas, the stoichiometric air-fuel ratio can range from approximately 9.5:1 to 10.5:1 depending on the specific composition of the gas.

Systems for Flex Fuel Operation with Natural Gas, Hydrogen, and their Blends

In one aspect, embodiments disclosed herein relate to systems for operating a flex fuel internal combustion engine system. FIG. 1 shows an overall system 100 including an engine 106, a fuel storage system 108, an air handling system 121, an air source 116, an exhaust to atmosphere stream 148, and a controller 170.

In the overall system 100, the engine 106 is fluidly connected to the fuel storage system 108 by a main fuel line 110. The engine 106 will be described in more detail in FIGS. 3A and 3B, below.

A fuel blend stream 115 flows from the fuel storage system 108, through the main fuel line 110, and to the engine 106. The main fuel line 110 may include a mass fuel flow sensor 111 configured to measure a mass flow rate of the fuel blend stream 115. The fuel storage system 108 may include a pressure sensor 109 configured to measure a pressure of a fuel blend within the fuel storage system 108.

The fuel storage system 108 of one or more embodiments may be any container known in the art capable of storing and dispensing a gaseous fuel blend. The specific size, shape, and volume of the fuel storage system may vary depending on the type of vehicle, engine size and type, and the like.

The pressure sensor 109 of one or more embodiments may be any pressure sensor capable of measuring a pressure in the fuel storage system 108. For example, the pressure sensor 109 may be a resistive film, a discrete resistor, capacitive, ultrasonic, and the like. The measured pressure in the fuel storage system 108 may be used, for example, to calculate an amount of fuel within the fuel storage system (e.g., based on the temperature and volume of the storage system containing the fuel), and/or to detect a change in the amount of fuel in the fuel storage system (e.g., where a change in pressure may indicate a change in the amount of fuel). In some embodiments, the fuel storage system may include a fuel storage tank, where the pressure sensor may be positioned in or around the tank (e.g., in or near a fluidly connected fuel pump) to measure the pressure within the tank. In one or more embodiments, one or more other types of sensors, in addition to or in alternative to use of a pressure sensor, may be used to monitor and/or determine an amount of fuel within the fuel storage tank, including but not limited to a level sensor positioned to measure a level of fuel within a fuel storage tank and/or a flow meter to measure an amount of fuel flowing into the fuel storage system.

The fuel blend stream 115 of one or more embodiments may include primarily methane ($CH_4$) and/or hydrogen ($H_2$) gas. For example, in one or more embodiments, a fuel blend stream may include natural gas, which may include a mixture of hydrocarbon gases primarily composed of $CH_4$ with lesser amounts of ethane ($C_2H_6$), propane ($C_3H_8$), butane ($C_4H_{10}$), and/or pentane ($C_5H_{12}$), and impurities such as carbon dioxide ($CO_2$), helium, nitrogen, and hydrogen sulfide ($H_2S$). The fuel blend stream 115 may have any composition of $CH_4$ and $H_2$ gas, including pure $CH_4$, pure $H_2$, and any combination therein. For example, in some embodiments, the fuel blend stream may include about 100% $CH_4$. In some embodiments, the fuel blend stream may include about 100% $H_2$. In some embodiments, the fuel blend stream may contain a blend of $CH_4$ and $H_2$, such as a blend of about 90% $CH_4$ and about 10% $H_2$, or a blend of about 80% $CH_4$ and about 20% $H_2$, or a blend of about 70% $CH_4$ and about 30% $H_2$, or a blend of about 60% $CH_4$ and about 40% $H_2$, or a blend of about 50% $CH_4$ and about 50% $H_2$, or a blend of about 40% $CH_4$ and about 60% $H_2$, or a blend of about 30% $CH_4$ and about 70% $H_2$, or a blend of about 20% $CH_4$ and about 80% $H_2$, or a blend of about 10% $CH_4$ and about 90% $H_2$, or any other combination. As would be understood by one of ordinary skill in the art, the fuel blend stream may include other components in minimal amounts, such as impurities and/or fuel additives, without diverging from the present disclosure.

The air handling system 121 of FIG. 1 is shown to illustrate an example of components and configurations that may be used. However, various modifications and/or other air handling systems are known in the art and may likewise be used with the systems and methods disclosed herein. As shown in FIG. 1, an air handling system 121 may be fluidly connected to the engine 106 by a main exhaust passage 114. The air handling system 121 will be described in more detail below.

An exhaust gas stream 117 may flow through the main exhaust passage 114, from the engine 106, to the air handling system 121. The main exhaust passage 114 may include an oxygen sensor 143 interfacing with the main exhaust passage 114 and configured to measure a residual oxygen concentration in the exhaust gas stream 117. The main exhaust passage 114 may also include at least one additional sensor 102 configured to measure at least one physical property of the exhaust gas stream 117 (e.g., temperature).

The exhaust gas stream 117 of one or more embodiments may include primarily combustion reaction products from the chemical reaction of natural gas and hydrogen with oxygen ($O_2$) in air. For example, the exhaust gas stream may include water, nitrogen, and carbon dioxide ($CO_2$). The exhaust gas stream may also include residual (unreacted) $O_2$, carbon monoxide (CO), and nitrogen oxides (NOx).

An oxygen sensor as described herein is a sensor that may be installed in the exhaust tract of the vehicle to measure the residual oxygen concentration in the exhaust gas. The oxygen sensor 143 may use the measured residual oxygen concentration to ensure optimum fuel to air ratio mixture preparation/mixture composition in order to reduce or maintain the emissions of the engine. In one or more embodiments, a minimum operating temperature in the main exhaust passage is reached prior to using the oxygen sensor to measure the residual oxygen concentration in the main exhaust passage. The minimum operating temperature may depend on the specific oxygen sensor employed and the specific fuel mixture to be combusted. As a non-limiting example, an oxygen sensor may begin to accurately measure oxygen concentration when the operating temperature reaches approximately 350 degrees. In one or more embodiments, the oxygen sensor may measure a residual oxygen content in the exhaust gas while the main exhaust passage has a temperature ranging from the minimum operating temperature to a maximum temperature, e.g., from a minimum operating temperature of about 300° C. to a maximum temperature of about 1,000° C. or greater. The residual oxygen content in the oxygen sensor then produces a voltage change, which may be correlated with the amount of residual oxygen content around the oxygen sensor in the main exhaust passage. The oxygen sensor may be any type of oxygen sensor, including a broadband probe, a jump probe, or the like. In some embodiments, more than one lambda probe is included in the system.

Measuring the oxygen concentration in the exhaust gas may correspond to an unreacted amount of oxygen after fuel combustion and may be beneficial for calculating an operating air-fuel ratio corresponding to a fuel blend, according to embodiments disclosed herein.

The at least one additional sensor 102 configured to measure at least one physical property of the exhaust gas stream may include one or more sensor, such as a pressure sensor and a temperature sensor, configured to measure a pressure and a temperature, respectively, of the exhaust gas stream. In one or more embodiments, the at least one additional sensor is a temperature sensor and is configured to measure a temperature of the exhaust gas stream.

Returning to FIG. 1, the overall system 100 also includes an air source 116. Air from the air source 116 may have any composition associated with atmospheric gases. As a non-limiting example, the air may include a majority of 78% nitrogen ($N_2$) gas and about 21% oxygen ($O_2$) gas. As would be understood by one of ordinary skill in the art, the air may also include small amounts of particulate matter and other gases, including by not limited to carbon dioxide, argon, and water vapor.

Air from the air source 116 may be transported through an air intake line 118 and may pass through an air filter 120 disposed on the air intake line 118 to produce a filtered air intake stream 122. In one or more embodiments, the filtered air intake stream may have the same gaseous composition as the air from the air source 116, except for particulate matter which may be removed by the air filter.

The air filter 120 of one or more embodiments may be any suitable air filter known in the art capable of removing particulate matter, such as dirt and/or debris, from an air stream prior to entering an engine. The air filter of one or more embodiments may be a paper (cellulose fiber) air filter, a foam filter, a synthetic or synthetic blend filter, or the like.

In FIG. 1, the air source 116 may be fluidly connected to the air handling system 121 by the air intake line 118 and the air filter 120 may be positioned upstream of the air handling system 121, such that the filtered air intake stream 122 from the air filter 120 on the air intake line 118 may flow into the air handling system 121. The air handling system 121 may receive the filtered air intake stream 122 and the exhaust gas stream 117 and produce an exhaust to atmosphere stream 148 and an air intake stream 119. The air intake stream 119 flows through a main intake passage 112. The main intake passage 112 fluidly connects the air handling system 121 to the engine 106.

In the alternative to and/or in combination with directing a filtered air stream through an engine's air handling system, a filtered air stream may be directed directly from an air filter to the main intake passage 112 (bypassing the turbocharger). As would be understood by one of ordinary skill in the art, the air intake stream may include air from the air source, recycled air from the air handling system, or a combination thereof. In other words, the air intake stream 119 may include any combination of the filtered air intake stream 122 and recycled air which is recycled in the air handling system 121.

An exhaust to atmosphere line 148 configured to transport the exhaust to atmosphere stream from the air handling system 121 to the atmosphere may include a back pressure valve 145. The back pressure valve 145 according to one or more embodiments may provide a pressure difference which acts to drive a portion of the exhaust to atmosphere stream 148 upstream towards the intake manifold (e.g., the exhaust recirculation stream 147), as shown in FIG. 1.

The main intake passage 112 may include a mass air flow sensor 113 configured to measure a mass flow rate of the air intake stream 119. The mass air flow sensor may be any mass air flow sensor known in the art. The mass air flow sensor according to one or more embodiments used for electronically controlled gasoline injection systems may be a blade (wing plate) type, measuring core type, hot wire type, hot film type, Karman scroll type, and the like. Measuring the mass flow rate of air entering the engine system may be beneficial for calculating an operating air-fuel ratio corresponding to a fuel blend, according to embodiments disclosed herein.

The overall system 100 shown in FIG. 1 also includes a controller 170, which may be configured to control and/or communicate with one or more components of the system. For example, the controller 170 may receive data (via wire or wirelessly) from one or more sensor(s), e.g., sensors 113, 143, 102, 111, 109, and/or air filter 120 and may send commands to one or more system components such as the engine 106 (e.g., intake/exhaust valves, spark ignition device(s), fuel injector(s), and/or other engine operating components) and valves positioned along one or more flow lines in the system (e.g., main fuel line 110, intake passage(s) and/or exhaust passage(s)). In some embodiments, a controller 170 may be connected to a variable valve train of an engine to control the intake and exhaust valves of the engine, where the variable valve train may adjust valve timing (when the intake/exhaust valves open/close), duration (how long the intake/exhaust valves remain open/closed), and/or lift (how much the intake/exhaust valves open). A variable valve train may be incorporated into the system, so the time for mixing of the fuel can be increased during the engine operation. The variable valvetrain may also be helpful in tailoring the effective compression ratio according to the reactivity of the fuel mixture combustion properties. The controller 170 may be a computer as described with reference to FIG. 4, below.

The example air handling system 121 shown in FIG. 1 includes a turbocharger system 141, a high pressure exhaust gas recycle mixer 138, a low pressure exhaust gas heat exchanger 154, and an air dryer 158. As would be understood by one of ordinary skill in the art, different components of the example air handling system 121 may be provided in different subsystems of the air handling system 121, for example as part of a "high pressure exhaust gas recirculation (HP-EGR) system" and as part of a "low pressure exhaust gas recirculation (LP-EGR) system." In embodiments where an air handling system includes an exhaust gas recirculation (EGR) system having HP-EGR and LP-EGR subsystems, the term HP-EGR subsystem refers to various components of the air handling system located upstream of the turbine whereas the term LP-EGR subsystem refers to various components of the air handling system located downstream of the turbine.

The turbocharger system 141 includes a compressor 144 and a turbine 126. As previously discussed, the air handling system 121 is fluidly connected to the engine 106 by a main exhaust passage 114, where an exhaust gas stream 117 exits the engine 106 by the main exhaust passage 114 and enters the air handling system 121.

Upon entering the air handling system 121, the main exhaust passage 114 may split into a first exhaust recirculation line 140 and a second exhaust recirculation line 142. The first exhaust recirculation line 140 contains a first portion of exhaust gas 117*a* which enters into the turbocharger system 141. The second exhaust recirculation line 142 contains a second portion of exhaust gas 117*b* which enters into the high pressure exhaust gas recycle mixer 138, which will be discussed in further detail, below. The first portion of exhaust gas 117*a* may include any components of the exhaust gas stream from which it originates. The second portion of exhaust gas 117*b* may include any components of the exhaust gas stream from which it originates.

As would be understood by one of ordinary skill in the art, the turbocharger system 141 includes a compressor 144 and a turbine 126. The turbine 126 includes a turbine wheel and a turbine housing. The turbine housing may guide an exhaust gas stream (e.g., the first portion of exhaust gas 117*a* in FIG. 1) into the turbine wheel. Energy from the exhaust gas turns the turbine wheel, and the gas then exits the turbine housing through an exhaust outlet area (for example, as a turbocharger exhaust stream 146).

The compressor 144 portion of the turbocharger system 141 includes a compressor wheel and a compressor housing. The compressor's mode of action is opposite that of the turbine 126. The compressor wheel is attached to the turbine by a shaft, and as the turbine turns the compressor wheel, the high-velocity spinning draws in air (e.g., a combined air stream 124 comprising a filtered air intake stream 122 and a recycled air stream) and compresses it to provide a pressurized air stream 128. The compressed air is pushed into the engine, allowing the engine to burn more fuel to produce more power.

A turbocharger system having a single compressor and turbine may be referred to as a single stage turbocharger, such as the system described above. In some embodiments, the turbocharger system 141 may be a multi-stage turbocharger. A multi-stage turbocharger refers to a turbocharger system including multiple turbochargers which work in tandem to compress the intake fuel/air mixture. For example, a two-stage turbocharger includes two turbochargers, each having a turbine and compressor. The multi-stage turbocharger may be arranged in parallel, sequential, or series arrangement.

In some embodiments, the turbocharger system 141 may be an electrically assisted turbocharger. An electrically assisted turbocharger (EAT) is an arrangement where an electric motor assists the gas-driven turbocharger in providing forced induction, particularly at times when exhaust gas flow is insufficient to produce the desired boost. Some systems integrate the motor inside a turbocharger, while others use a separate electric supercharger.

Returning to FIG. 1, the turbocharger system 141 is configured to produce a turbocharger exhaust stream 146. In one or more embodiments, the turbocharger exhaust stream 146 may be split into an exhaust recirculation stream 147 and the exhaust to atmosphere stream 148. The exhaust to atmosphere stream 148 may include any components of the turbocharger exhaust stream 146 from which it originates. The turbocharger exhaust stream 146 may include any components of the first portion of exhaust gas 117a from which it originates. The exhaust recirculation stream 147 may include any components of the turbocharger exhaust stream 146 from which it originates.

In FIG. 1, the exhaust recirculation stream 147 may then enter low pressure exhaust gas heat exchanger 154. The low pressure exhaust gas heat exchanger 154 is configured to receive and cool the exhaust recirculation stream 147 and produce a cooled exhaust recirculation stream 156.

The low pressure exhaust gas heat exchanger 154 of one or more embodiments may lower the temperature of the exhaust gas prior to introducing it to the intake air. The low pressure exhaust gas heat exchanger may include a by-pass valve which directly circulates exhaust gas into the engine when the engine is cold. The low pressure exhaust gas heat exchanger may be any known in the art.

The cooled exhaust recirculation stream 156 may include any components of the pressurized compressed exhaust recirculation stream from which it originates. Depending on the fuel blend, the temperature of the exhaust gas exiting the engine may vary. For example, the temperature of the exhaust gas may be about 500° C. or greater. The low pressure exhaust gas heat exchanger acts to lower the temperature of the cooled exhaust gas recycle stream as much as possible, preferably to a temperature of about 150° C. or lower.

The cooled exhaust recirculation stream 156 may then enter an air dryer 158 configured to receive the cooled exhaust recirculation stream 156 and produce a dried exhaust recirculation stream 162. The dried exhaust recirculation stream 162 may then be combined with the filtered air intake stream 122 to produce a combined air stream 124, where the combined air stream 124 enters the turbocharger system 141.

The air dryer 158 according to one or more embodiments may remove water from the cooled exhaust recirculation stream to prevent water collection within the air handling system. The air dryer may be any device known in the art capable of removing moisture from an air stream in an air handling system. For example, the air dryer may be a cartridge type air dryer, containing a desiccant which removes water from an air stream.

The dried exhaust recirculation stream 162 may include any components of the cooled exhaust recirculation stream 156 from which it originates. The dried exhaust recirculation stream, however, will have a relatively lower moisture content compared to the cooled exhaust recirculation stream. The air dryer acts to lower the moisture content of the dried exhaust recirculation stream as much as possible.

The combined air stream 124 may include a combination of the components of the dried exhaust recirculation stream and the filtered air intake stream from which it originates. For example, the combined air stream may include primarily $N_2$ and $O_2$, and relatively smaller amounts of exhaust gases such as $H_2O$, $CO$, $CO_2$, and $NO_x$.

Keeping with FIG. 1, the turbocharger system 141 is also configured to produce a pressurized air stream 128. The pressurized air stream 128 may enter an air cooler 130 configured to cool the pressurized air stream 128, when needed, and produce a cooled air stream 132 (e.g., having a temperature ranging from about 200° C. to ambient temperature).

The pressurized air stream 128 may include any components of the combined air stream from which it originates. In embodiments with single or multi-stage turbochargers, the pressure of the pressurized air stream will be dependent on which turbocharger is used in the system. Therefore, the pressurized air stream and components may vary based on the specifics of the system and are designed to withstand the mechanical and operational limits for such application.

The cooled air stream 132 may then pass through an intake heater 134 to produce a heated air stream 136 when needed. The heated air stream 136 may then enter the high pressure exhaust gas recycle mixer 138. The high pressure exhaust gas recycle mixer 138 is configured to receive at least the heated air stream 136 and the second portion of exhaust gas 117b, as previously described, and produce the air intake stream 119. The air intake stream 119 flows through the main intake passage to the engine 106, as described with reference to FIG. 1A.

The intake heater 134 of one or more embodiments may be an electrical heater used to assist the engine with cold start and to compensate reactivity losses when needed. The intake heater may be any device known in the art and may be operated at 12V or 48V, as non-limiting examples.

The heated air stream 136 may include any components of the cooled air stream 132 from which it originates. The temperature of the heated air stream may vary without diverging from the scope of the present disclosure. As a non-limiting example, in some embodiments the heated air stream may have a temperature in a range of from about 45° C. to about 75° C. For example, the temperature of the heated air stream may be in a range having a lower limit of from about 45, 50, and 55° C. to an upper limit of from about 60, 70, and 75° C., where any lower limit may be paired with any upper limit.

One of ordinary skill in the art may appreciate that the pressurized air stream 128 may flow through an air cooler and/or an intake heater with or without being cooled or heated, depending on the operating conditions of the engine. For example, the air cooler 130 may cool the pressurized air stream 128 when the pressurized air stream 128 has relatively high temperatures from the engine's operation, while the intake heater may heat the pressurized air stream 128 when the pressurized air stream 128 is generated during a cold start and/or when the pressurized air stream 128 is generated mostly or completely from an air source. The high pressure exhaust gas recycle mixer 138 of one or more embodiments may be any mixer known in the art capable of mixing gas streams.

The system of FIG. 1 may also include a controller 170. The controller 170 may be a computer as described with reference to FIG. 4, below. The example air handling system 121 of FIG. 1 may help to manage air intake into the engine and includes a turbocharger to assist with delivering efficient operation across a range of equivalence ratios. The air handling system may also be used to reduce engine demand over the air management system for combustion control. The air handling system shown in FIG. 1 is an example provided for illustration of how an air handling system may be incorporated into systems according to embodiments of the present disclosure designed to operate with various types of fuels. One of ordinary skill in the art may appreciate that various other types of air handling systems may be used with systems disclosed herein, for example, air handling systems using one or more of the described air handling system components in different arrangements and/or omitting one or more of the described air handling system components.

Figure 2A:
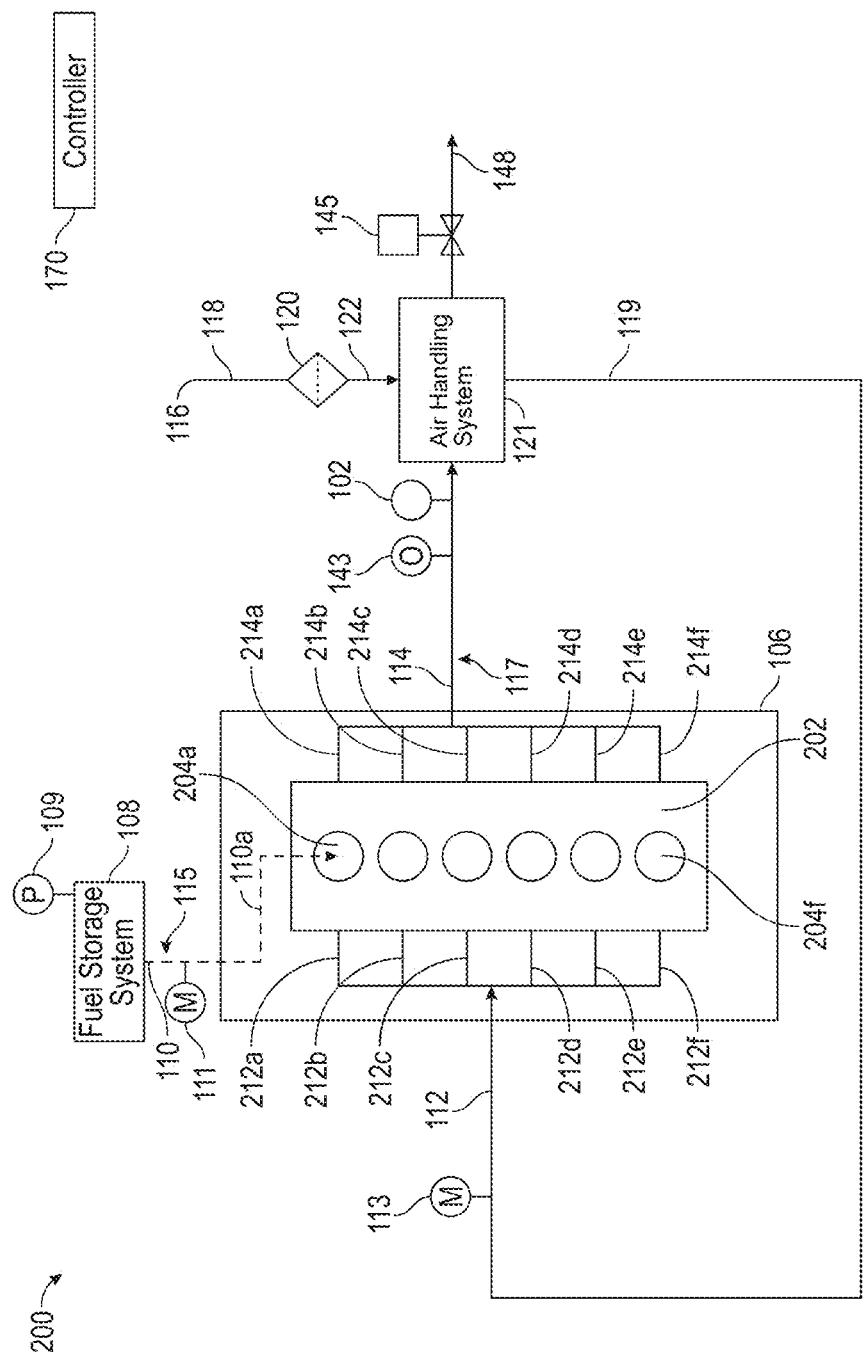
FIG. 2A illustrates an engine system according to one or more embodiments.
Figure 2B:
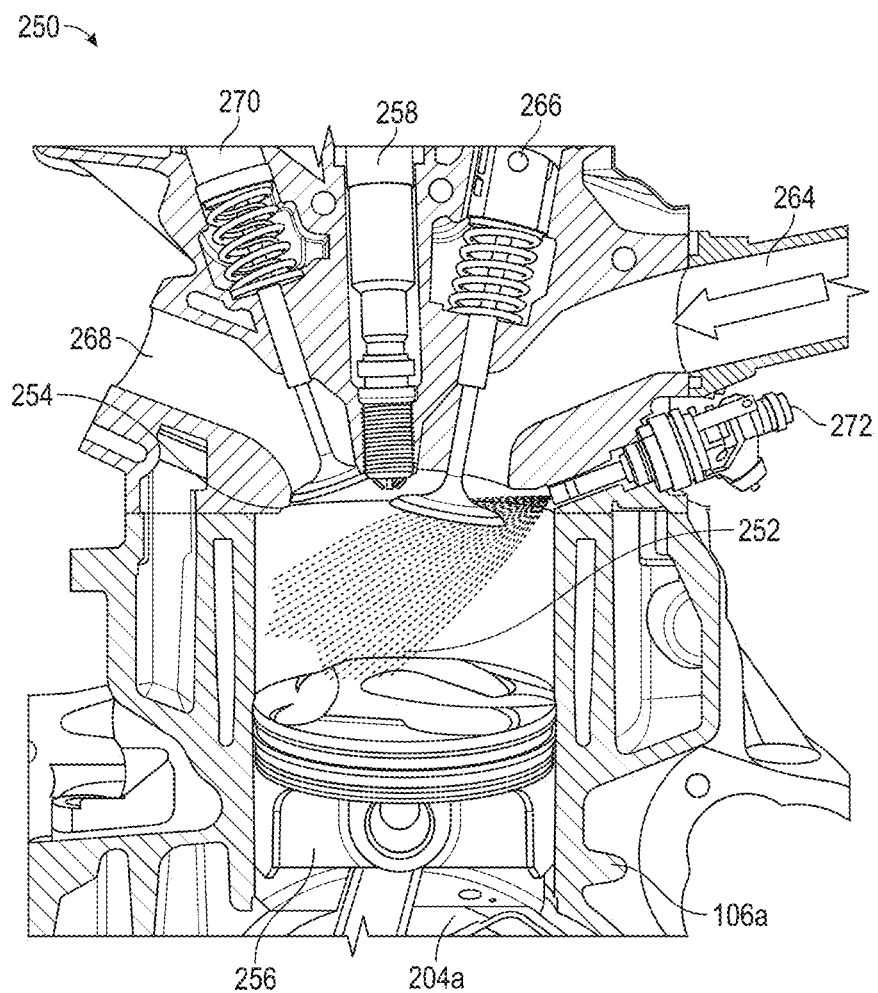
FIG. 2B illustrates a combustion system according to one or more embodiments.

FIGS. 2A-B are discussed together and illustrate an engine system 200 in accordance with one or more embodiments. The engine system 200 includes a cylinder block 202, having at least a first cylinder 204a, as part of the engine 106. For illustration purposes, FIG. 2A shows six cylinders, 204a-204f, however the engine 106 of one or more embodiments may include any number of cylinders.

FIG. 2B shows a combustion system 250 for the first cylinder 204a, in accordance with one or more embodiments. In FIG. 2B, only one cylinder in the engine is shown, although combustion system 250 may include several cylinders, such as the six cylinders 204a-204f shown in FIG. 2A). The engine system 200 of one or more embodiments may be an already existing internal combustion engine adapted to include the features outlined in the following sections. In some embodiments, the engine system 200 may be a blank sheet design built specifically to perform combustion of the flex fuel mixture disclosed herein.

Each cylinder 204a-204f may include a main chamber 252. The main chamber 252 may be a combustion chamber of the combustion system 250. Additionally, a cylinder head 254 may be mounted at a top of the cylinder 204a and forms an upper end of the main chamber 252.

The engine 106 is fluidly connected to the fuel storage system 108 via a main fuel line 110, as previously discussed. Each cylinder 204a-204f may have a fuel injector (not shown) mounted in the cylinder head 254 and fluidly connecting the main chamber 252 to the fuel storage system 108 via an associated fuel line. For example, the main fuel line 110 may split into a first fuel line 110a entering into the first cylinder 204a, a second fuel line 110b entering into the second cylinder 204b, and so on. Fuel from the fuel storage system 108 may be directed to the fuel injector via the fuel line(s), where the fuel injector may spray fuel into the main chamber 252 (e.g., at a spray angle via one or more nozzles of the fuel injector).

Each cylinder 204a-204f may also be connected to the main intake passage 112 by an intake passage 212a-212f, respectively, and to the main exhaust passage 114 by an exhaust passage 214a-214f, respectively. As illustrated in FIG. 2A, each intake passage 212a-212f is fluidly connected to the main intake passage 112 such that the main intake passage 112 may provide air via the air intake stream 119 into each of the intake passages 212a-212f. Similarly, each exhaust passage 114a-114f is fluidly connected to the main exhaust passage 114 such that the exhaust gas stream 117 is a mixture of each of the exhaust gases exiting each exhaust passage 114a-114f.

The engine system 200 of FIG. 2A also includes the air handling system 121 and a controller 170, as previously described. The air handling system 121 is fluidly connected to the engine 106 by the main exhaust passage 114. In one or more embodiments, a catalyst, such as a three-way catalyst, selective reduction catalyst, and lean oxidation catalyst may be integrated proximate to the main exhaust passage. The catalyst may help to reduce engine emissions to the atmosphere. Air from an air source 116 may be routed through the air handling system 121 and/or may be routed to bypass the air handling system 121 to provide the air intake stream 119.

A piston 256 may be arranged inside each cylinder 204a and forms a lower end of the main chamber 252. The piston 256 moves up and down inside the cylinder 204a during an engine cycle, and the volume of the main chamber 252 changes with the position of the piston 256. Further, the piston 256 may be connected to a crankshaft (not shown) by a connecting rod. The crankshaft may convert the reciprocating motion of the piston 256 into rotary motion, as is well known in the art.

The combustion system of one or more embodiments may be a high tumble system. In internal combustion engine operation, "tumble" generally refers to a rotational motion of air entering the combustion chamber, at an angle which is approximately normal to the crankshaft. Higher tumble combustion systems therefore help to increase a burn rate in the combustion chamber by means of higher turbulent flame speed for neat natural gas or mixtures containing high natural gas concentration.

The piston and cylinder of one or more embodiments may have any suitable geometry known in the art. To improve engine operation and/or efficiency a shallow bowl piston and a pent-roof cylinder head may be used. A bowl, otherwise referred to as a dish, type piston may have a recessed volume formed at the piston head surface and is typically used to reduce compression ratio because it adds volume to the chamber. A bowl type piston may be used in turbocharged or supercharged engines to help avoid detonation, allowing for a fast-burning, compact combustion chamber. A pent-roof cylinder head is a cylinder head having a concave or wedge-shaped surface forming the top of the main chamber 252, which may allow a spark plug 258 to be located close to the center of the combustion chamber between the intake and exhaust valves 266, 270. The shallow bowl piston and pent-roof cylinder heat may help to sustain tumble during the compression stroke and improve air-fuel mixing at the spark timing moment.

A spark plug 258 may be connected to and configured to interface with the main chamber 252. The spark plug of one or more embodiments may be any known in the art, such as a "cold spark plug," providing enough heat dissipation and mitigating hot spots.

A direct injection injector 272 may also be connected to and configured to interface with the main chamber 252. The direct injection injector 272 according to one or more embodiments may be configured to inject a fuel into the main chamber 252. For example, the injector may be mounted to the cylinder (e.g., in a cylinder head or cylinder block) and positioned to have a fuel outlet interfacing with the main chamber. The direct injection injector may be any known in the art, such as a low, medium, or high-pressure direct injection injectors.

Still referring to FIG. 2B, the cylinder head 254 may include an intake passage 212a terminating in an intake port 264 to the main chamber 252. Additionally, an intake port 264 may include an intake valve 266 to control opening and closing of the intake port 264. The main chamber 252 and the intake passage 212a may be connected to a source of air via one or more intake lines, for example, as described in the preceding Figures. The air in the main chamber 252 and the intake passage 212a may be ambient air or a mixture of ambient air and recirculated exhaust gases, as previously described.

The cylinder head 254 may also include an exhaust passage 214a having in an exhaust port 268. An exhaust valve 270 may be arranged to control opening and closing of the exhaust port 268. When the exhaust port 268 is open, exhaust gases can be pushed out of the main chamber 252 into the exhaust passage 214a. An intake passage 212a, an exhaust passage 214a and associated components (e.g., valves 266, 270 and fuel injector) may be provided in the cylinder head 254 for each cylinder in the combustion system 250, such as in the arrangement shown in FIG. 2B for the cylinder 204a. In one or more embodiments, the fuel injector may be used to directly inject fuel into the main chamber 252 and/or intake passage 212a. The fuel injector may be fluidly connected to a fuel line 110, which is in communication with a fuel storage system 108.

In one or more embodiments, a controller 170 may include a control system, such as an engine control unit, which may control an opening and closing of the fuel injector to deliver the fuel into the main chamber 252 at desired times during an engine cycle. The control system may also control opening and closing of the intake and exhaust valves 266, 270. In one or more embodiments, the controller 170 may include a processor and a user interface panel at which a user may provide an input, such as a command, to the controller 170. In one or more embodiments, the controller 170 may be a computer such as the computer described in FIG. 4.

In some embodiments, a cable (not shown), such as an electrical or hydraulic power cable, may be coupled to the fuel injector. The cable may provide power to the fuel injector (or fuel pump used to dispense fuel from the fuel injector) from a power source (not shown). Additionally, the cable may be connected to the controller 170 to control the fuel injector. The controller 170 may include instructions or commands to operate the fuel injector automatically or a user may manually control the controller 170 at a user interface panel (not shown). It is further envisioned that the controller 170 may be connected to an office via a satellite such that a user may remotely monitor conditions and send commands to the fuel injector. If leaks and performance issues are found, an alert may be sent to the control system to adjust or turn off the fuel injector manually or automatically.

Methods for Flex Fuel Operation with Natural Gas, Hydrogen, and their Blends

Embodiments disclosed herein also relate to methods for flex fuel operation in an engine using a fuel blend. As discussed above, the fuel blend of one or more embodiments includes natural gas, hydrogen, and blends thereof.

Methods described according to one or more embodiments may be used to advantageously tailor boundary conditions (i.e., engine operating conditions) to enable efficient flex fuel operation with hydrogen, natural gas, and blends thereof. Tailoring of boundary conditions may be used as a compensation lever for the differences in reactivity and combustion properties of the fuels. For example, neat hydrogen has a faster laminar flame speed, while natural gas is slower. To compensate for these differences, the parabolic behavior of laminar flame speed with respect to equivalence ratio is considered.

Figure 3A:
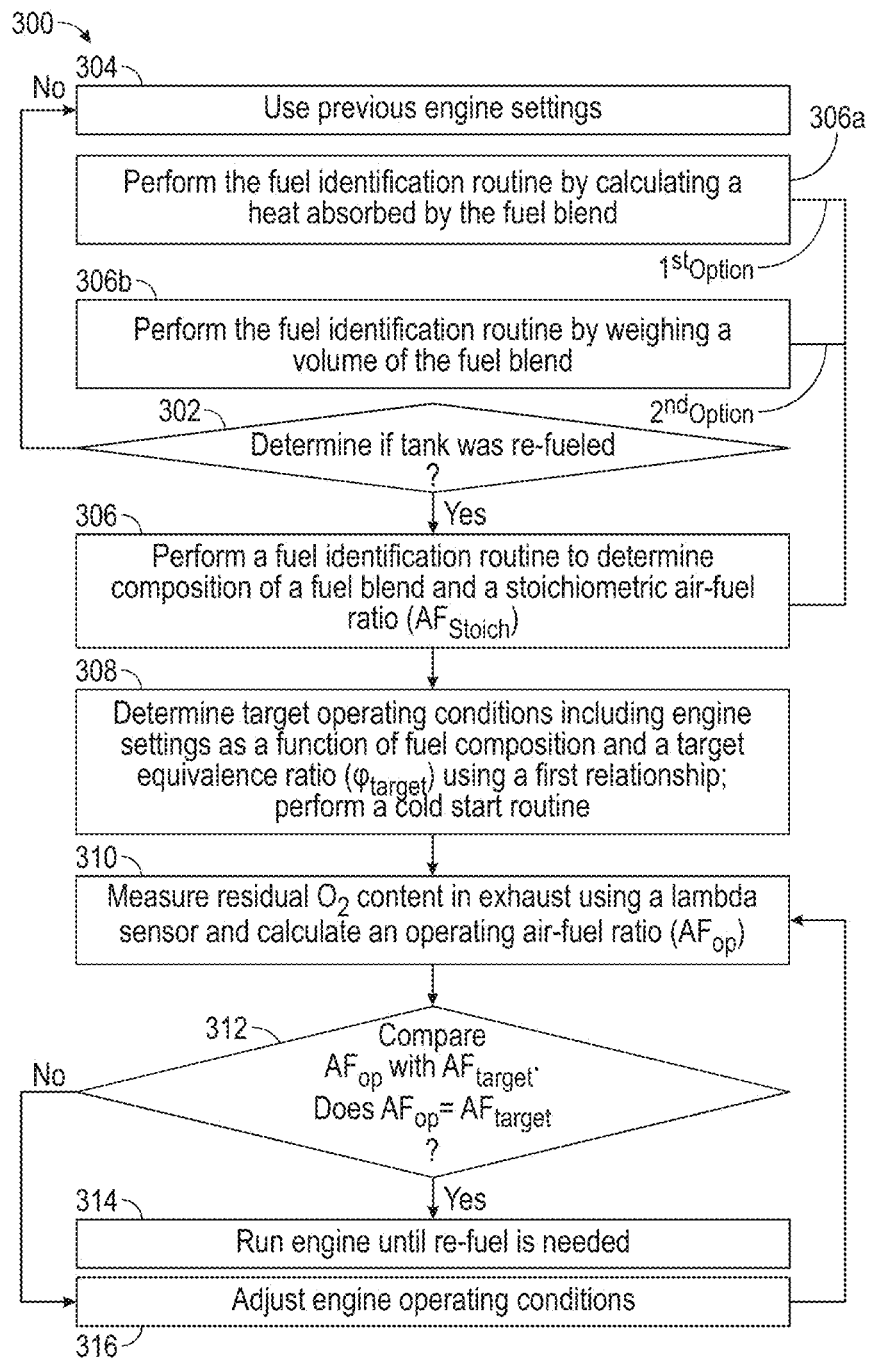
FIG. 3A is a flow chart for a method for fuel blend determination and engine operation according to one or more embodiments.

FIG. 3A illustrates a method 300 for fuel blend determination and engine operation according to one or more embodiments disclosed herein. The method 300 includes, in step 302, determining if a fuel storage system (such as the fuel storage system 108 in FIGS. 1 and 2A-B) was re-fueled. In some embodiments, determining if the fuel storage system was re-fueled includes measuring, using a pressure sensor (i.e., pressure sensor 109 in FIGS. 1 and 2A-B) located within the fuel storage system, a measured fuel pressure upon engine startup and after re-fueling, where re-fueling occurs at a time prior to engine startup. The measured fuel pressure may then be compared to a fuel pressure at engine shutoff, where engine shutoff occurs at a time prior to re-fueling and prior to engine startup. As would be understood by one of ordinary skill in the art, a measured fuel pressure may vary as a function of temperature. Accordingly, re-fueling may be required if the measured fuel pressure is less than or equal to the fuel pressure at engine shutoff. Or, due to variations of pressure as a function of temperature, re-fueling may be required if the measured fuel pressure falls within a range of values, where the range may be equal to the fuel pressure at engine shutoff, ±5 bar. In one or more embodiments, if the measured fuel pressure is less than or equal to the fuel pressure at engine shutoff within a range, a fuel identification routine is not performed, and engine operation settings from the last time the engine was operated may be used, as shown in step 304.

If the measured fuel pressure is greater than the fuel pressure at engine shutoff, a fuel identification routine is performed in step 306 to determine a fuel blend composition at engine startup. A pressure increase in the fuel storage system may indicate a possible refueling and therefore a possible change in fuel blend composition. Specifically, the fuel blend composition may include a concentration of natural gas ($CH_4$) and a concentration of hydrogen gas ($H_2$). Once the fuel blend composition is determined, a stoichiometric air-fuel ratio ($AF_{Stoich}$) for operating an engine at the fuel blend composition may be determined by the controller. The stoichiometric air-fuel ratio according to one or more embodiments depends on the fuel blend composition. In one or more embodiments, the controller may be hardcoded with a table relating the fuel blend composition (e.g., an amount of natural gas and an amount of hydrogen) to the corresponding stoichiometric air-fuel ratio such that, when the fuel blend composition is determined, the controller may determine the corresponding stoichiometric air-fuel ratio.

Figure 3B:
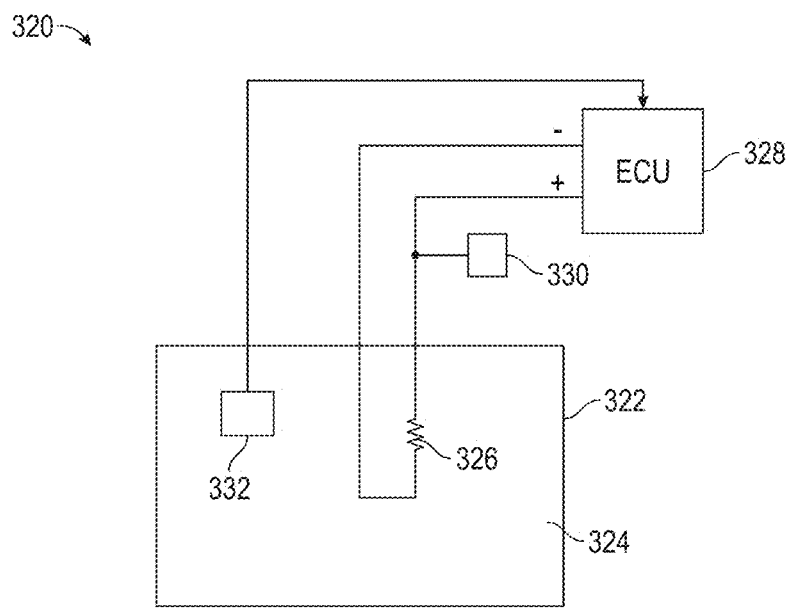
FIG. 3B illustrates a first fuel reservoir system according to one or more embodiments.

As shown in step 306a in the method 300 of FIG. 3A, performing the fuel identification routine may include calculating a heat absorbed by the fuel blend using temperature compensation resistance, heating resistance, and a power supply circuit. FIG. 3B shows an example system which may be used to perform the fuel identification routine of step 306a. In FIG. 3B, a resistor 326 may be placed in a fuel reservoir 322 located downstream of the fuel storage system (for example, the fuel reservoir 322 may be located downstream of the fuel storage system 108 on the main fuel line 110 or any other part of the fuel supply system shown in FIG. 1). The resistor 326 may be used to heat an amount of fuel 324 located in the fuel reservoir 322. A temperature sensor 332 located within the fuel reservoir 322 is in electrical communication with a controller 328 (e.g., 170 in FIG. 1) and may be used to measure a fuel temperature. Similarly, a current measuring sensor 330 may be disposed on the resistor 326 and may be in electrical communication with the controller 328. The current measuring sensor 330 is configured to measure a current of the resistor 326. The resistor 326 may be coupled to a power supply circuit (not shown) and to the controller 328, which may be used to control voltage sent through the resistor 326 and to record changes in voltage occurring when the amount of fuel 324 is heated. In one or more embodiments, the controller stores a pre-calibrated relationship between voltage, current, and/or resistance and fuel concentration (e.g., percent hydrogen in fuel or percent natural gas in fuel). The controller may also store a relationship between temperature and resistance for the resistor 326 and a relationship between resistance and heat capacity (or other properties) of the fuel blend.

Continuing with method step 306a, the fuel identification routine includes using the components described in FIG. 3B above to apply a voltage to the resistor 326 in the fuel reservoir 322 using the controller 328, where the applied voltage is a known value. As the voltage is applied, current flows through the resistor 326, heating the fuel 324. The amount of energy dissipated from the resistor 326 to the fuel 324 is a function of fuel composition and physical state of the fuel (e.g., liquid or gas) and every composition has a unique heat transfer amount and therefore a unique heat capacity. When the current value (measured by the current sensor 330) reaches steady state, a voltage, a current, and a temperature at steady state are measured by the controller 328, using the current sensor 330, and the temperature sensor 332, respectively.

The heat capacity of the fuel is then calculated using Equation 3, below:

$$k = \frac{(U \cdot I)}{A \cdot (T_q - T_f)} \quad \text{(Equation 3)}$$

where k is the fuel blend heat capacity, U is voltage, I is current, A is a surface area which contacts the fuel, $T_q$ is the resistor temperature, and $T_f$ is the fuel temperature. Therefore, the heat capacity at constant pressure can be determined and correlated back to a given mixture of natural gas and hydrogen using the heat capacities of natural gas (~35.8 kJ/kgK) and hydrogen (14.2 kJ/kgK) and the relationship between resistance and heat capacity (or other properties) of the fuel blend.

Figure 3C:
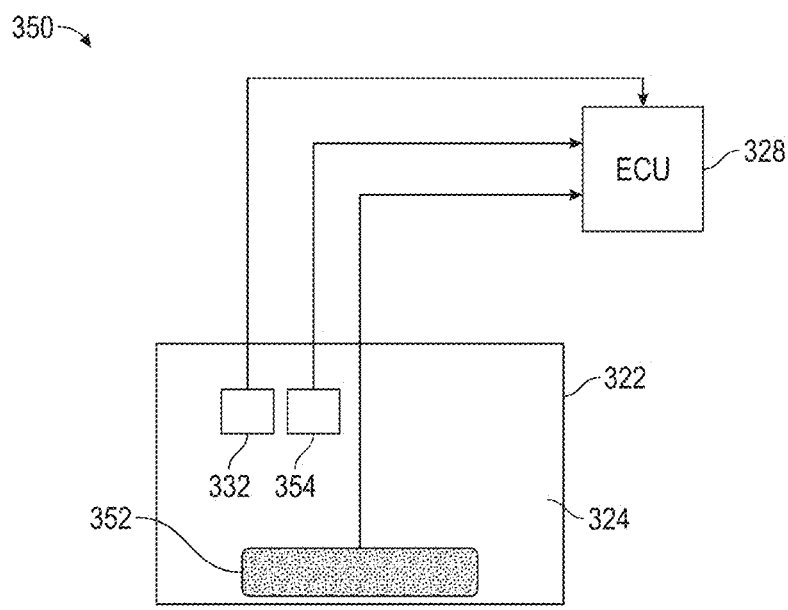
FIG. 3C illustrates a second fuel reservoir system according to one or more embodiments.

Alternatively, in step 306b, performing the fuel identification routine may include weighing, using a scale located within a fuel reservoir 322, the fuel blend 324 in the fuel reservoir 322 and calculating an amount of natural gas and an amount of hydrogen in the fuel blend. FIG. 3C shows an example system which may be used to perform the fuel identification routine of step 306b. In FIG. 3C, a scale 352 may be placed in a fuel reservoir 322 located downstream of the fuel storage system (for example, the fuel reservoir 322 may be located downstream of the fuel storage system 108 on the main fuel line 110 or any other part of the fuel supply system shown in FIG. 1). The scale 352 may be electrically connected to the controller 328. In one or more embodiments, the controller stores a pre-calibrated relationship between fuel density and fuel concentration (e.g., percent hydrogen in fuel or percent natural gas in fuel). An amount of fuel 324 located in the fuel reservoir 322 may be weighed using the scale 352 and the weight measurement may be sent to the controller 328. A temperature sensor 332 within the fuel reservoir 322 and electrically connected to the controller 328 may be used to measure a fuel temperature. Similarly, a pressure sensor 354 within the fuel reservoir 322 and electrically connected to the controller 328 may be used to measure a fuel pressure.

Continuing with the method of step 306b, the fuel identification routine includes using the components described in FIG. 3C which may be used to weigh a volume of fuel 324 in the fuel reservoir 322 and calculate a density of the fuel 324. In one or more embodiments, the density of the fuel 324 in the fuel reservoir 322 may be calculated using the ideal gas law, since the pressure and temperature of the fuel 324 are measured and the volume of the fuel reservoir 322 is known. Once the density is determined, the controller 328 determines a fuel composition based on the pre-calibrated relationship between fuel blend density and fuel composition.

Returning to FIG. 3A, once the fuel blend composition has been determined, the method 300 further includes, in step 308, determining target operating conditions, including engine settings as a function of fuel composition and a target equivalence ratio ($\varphi_{Target}$) corresponding to the composition of the fuel blend using at least one fuel-engine relationship (e.g., a first relationship). For example, a fuel-engine relationship may be selected from one or more relationships relating the amount of hydrogen in the fuel blend to a target air-fuel ratio, a manifold air pressure, a spark timing, and/or a back pressure for the engine. Such relationships are described in more detail in FIG. 5.

A fuel-engine relationship may also be used to determine a manifold air pressure, a spark timing, and a back pressure for operating the engine during a cold start routine. From the target equivalence ratio and the stoichiometric air-fuel ratio determined in step 306, a target air-fuel ratio may then be calculated using Equation 4, below (analogous to Equation 2). In one or more embodiments, the target air-fuel ratio corresponds to a target operating air-fuel ratio at the target equivalence ratio. In some embodiments, the target air-fuel ratio may be a constant value. In some embodiments, the target air-fuel ratio may be a function of engine speed and load and other engine operating parameters. The target air-fuel ratio is then used to perform a cold start routine on the engine.

$$\lambda_{target} = \frac{AF_{target}}{AF_{Stoich}} = \frac{1}{\varphi_{Target}} \quad \text{(Equation 4)}$$

where λ is an excess air ratio, p is the equivalence ratio, and AF is the air fuel ratio.

The term "cold start routine" as used herein refers to a period of time of about 10 seconds to 20 seconds after the engine starts. During this time, an oxygen sensor (such as the oxygen sensor 143 shown in FIGS. 1 and 2A) located on a main exhaust passage (e.g., main exhaust passage 114) is "cold," meaning that it has not reached a minimum operating temperature where the oxygen sensor becomes ready for measurement. The minimum operating temperature for the oxygen sensor may vary, however the minimum operating temperature may have a value of about 1200° F.

Returning to FIG. 3A, the method 300 also includes, in step 310, measuring a residual oxygen content in an exhaust gas (for example, exhaust gas stream 117 in FIGS. 1 and 2A) using an oxygen sensor disposed in a main exhaust passage of the engine, a residual oxygen concentration in an exhaust gas stream. The measured residual oxygen content may be used to calculate an operating air-fuel ratio ($AF_{op}$). In some embodiments, calculating the operating air-fuel ratio includes measuring, using a mass air flow sensor located on a main intake passage, a mass flow rate of intake air entering the engine, where the intake air includes recycled air and ambient air, and measuring, using a mass fuel flow sensor located on a main fuel line fluidly connected to a fuel storage system, a mass flow rate of the fuel blend entering the engine during engine operation.

As would be understood by one of ordinary skill in the art, an oxygen sensor generally measures the residual oxygen content in the exhaust gas stream. The measured residual oxygen content is then compared to an atmospheric oxygen content (i.e., approximately 20.8 vol %). In response to a difference in measured residual oxygen content and the atmospheric oxygen content, the oxygen sensor generates a voltage signal corresponding to the magnitude of the difference in oxygen content indicating if the operating air-fuel ratio is either rich (i.e., the amount of fuel during operation is higher than a stoichiometric amount of fuel, where the stoichiometric amount of fuel consumes exactly the amount of oxygen present in the air stream) or lean (i.e., the amount of fuel during operation is lower than a stoichiometric amount of fuel and residual oxygen will be present in the exhaust gas) in fuel content. If a rich air-fuel mixture is detected, a controller electrically connected to at least the engine and the oxygen sensor may produce a signal to increase an air inlet flowrate or decrease a fuel inlet flowrate. Conversely, if a lean air-fuel mixture is detected, the controller may produce a signal to increase the fuel inlet flowrate or decrease the air inlet flowrate. An engine system may operate using one or more oxygen sensors which may perform the same function as outlined above or another function, as known in the art.

Still referring to FIG. 3A, the operating air-fuel ratio ($AF_{op}$) may then be compared to the target air-fuel ratio ($AF_{target}$) in step 312 of the method 300. If the calculated operating air-fuel ratio is equal to the target air-fuel ratio, the engine may be run until a re-fuel is needed, as shown in step 314 of the method 300. If the calculated operating air-fuel ratio is not equal to the target air-fuel ratio, step 316 of the method 300 is performed where engine operating conditions (for example, one or more of the operating conditions included in FIG. 5 and discussed below) may be adjusted using a controller, until the operating air-fuel ratio equals the target air-fuel ratio. In some embodiments, the method 300 further includes using at least one sensor in an air handling system of the engine to perform a composition confirmation routine, as will be described in FIG. 4, below. Steps 310, 312, and 316 may then be repeated any number of times, where an updated operating air-fuel ratio is calculated in step 310 and compared to the target air-fuel ratio in step 312. In one or more embodiments, steps 310, 312, and 316 may be repeated until a user requirement of certainty is met.

One or more steps in method 300 may be omitted, repeated, performed concurrently, and/or performed in a different order. For example, in one or more embodiments, step 302 may be omitted, and step 306 may be performed at every engine start-up.

Figure 4:
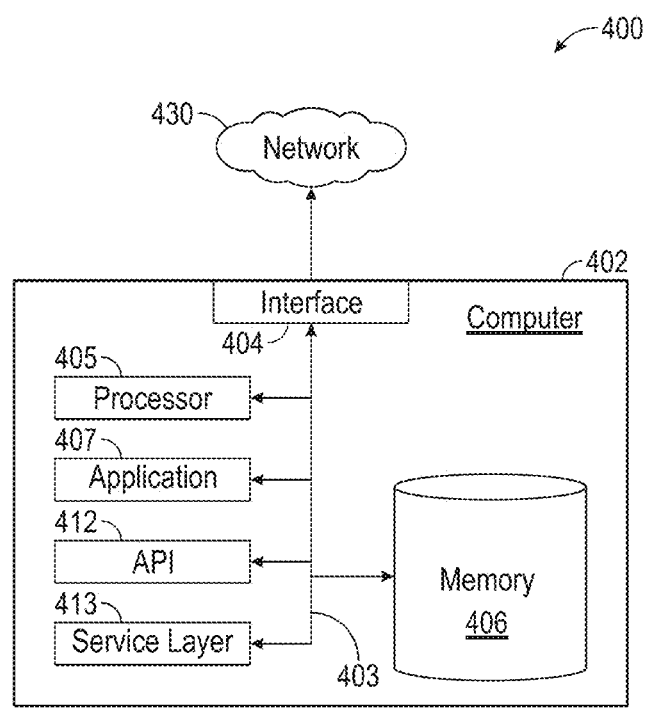
FIG. 4 is a computer system according to one or more embodiments.

FIG. 4 shows a computer 400 system that may be used in systems and methods according to embodiments of the present disclosure, e.g., to control engine systems, collect engine system data, and process data according to embodiments of the present disclosure to calculate optimized engine operation parameters. Specifically, FIG. 4 shows a block diagram of a computer 400 system used to provide computational functionalities associated with described algorithms, methods, functions, processes, flows, and procedures as described in the instant disclosure, according to an implementation. The illustrated computer 400 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device.

Additionally, the computer 400 may include a computer that includes an input device, such as a keypad, keyboard, touch screen, or other device that can accept user information, and an output device that conveys information associated with the operation of the computer 400, including digital data, visual, or audio information (or a combination of information), or a GUI.

The computer 400 can serve in a role as a client, network component, a server, a database or other persistency, or any other component (or a combination of roles) of a computer system for performing the subject matter described in the instant disclosure. The illustrated computer 400 is communicably coupled with a network 402. In some implementations, one or more components of the computer 400 may be configured to operate within environments, including cloud-computing-based, local, global, or other environment (or a combination of environments).

At a high level, the computer 400 is an electronic computing device operable to receive, transmit, process, store, or manage data and information associated with the described subject matter. According to some implementations, the computer 400 may also include or be communicably coupled with an application server, e-mail server, web server, caching server, streaming data server, business intelligence (BI) server, or other server (or a combination of servers).

The computer 400 can receive requests over network 402 from a client application (for example, executing on another computer 400) and responding to the received requests by processing the said requests in an appropriate software application. In addition, requests may also be sent to the computer 400 from internal users (for example, from a command console or by other appropriate access method), external or third-parties, other automated applications, as well as any other appropriate entities, individuals, systems, or computers.

Each of the components of the computer 400 can communicate using a system bus 404. In some implementations, any or all of the components of the computer 400, both hardware or software (or a combination of hardware and software), may interface with each other or the interface 406 (or a combination of both) over the system bus 404 using an application programming interface (API) 408 or a service layer 410 (or a combination of the API 408 and service layer 410. The API 408 may include specifications for routines, data structures, and object classes. The API 408 may be either computer-language independent or dependent and refer to a complete interface, a single function, or even a set of APIs. The service layer 410 provides software services to the computer 400 or other components (whether or not illustrated) that are communicably coupled to the computer 400.

The functionality of the computer 400 may be accessible for all service consumers using this service layer 410. Software services, such as those provided by the service layer 410, provide reusable, defined business functionalities through a defined interface. For example, the interface may be software written in JAVA, C++, or other suitable language providing data in extensible markup language (XML) format or other suitable format. While illustrated as an integrated component of the computer 400, alternative implementations may illustrate the API 408 or the service layer 410 as stand-alone components in relation to other components of the computer 400 or other components (whether or not illustrated) that are communicably coupled to the computer 400. Moreover, any or all parts of the API 408 or the service layer 410 may be implemented as child or sub-modules of another software module, enterprise application, or hardware module without departing from the scope of this disclosure.

The computer 400 includes an interface 406. Although illustrated as a single interface 406 in FIG. 4, two or more interfaces 406 may be used according to particular needs, desires, or particular implementations of the computer 400. The interface 406 is used by the computer 400 for communicating with other systems in a distributed environment that are connected to the network 402. Generally, the interface 406 includes logic encoded in software or hardware (or a combination of software and hardware) and operable to communicate with the network 402. More specifically, the interface 406 may include software supporting one or more communication protocols associated with communications such that the network 402 or interface's hardware is operable to communicate physical signals within and outside of the illustrated computer 400.

The computer 400 includes at least one computer processor 412. Although illustrated as a single computer processor 412 in FIG. 4, two or more processors may be used according to particular needs, desires, or particular implementations of the computer 400. Generally, the computer processor 412 executes instructions and manipulates data to perform the operations of the computer 400 and any algorithms, methods, functions, processes, flows, and procedures as described in the instant disclosure.

The computer 400 also includes a non-transitory computer 400 readable medium, or a memory 414, that holds data for the computer 400 or other components (or a combination of both) that can be connected to the network 402. For example, memory 414 can be a database storing data consistent with this disclosure. Although illustrated as a single memory 414 in FIG. 4, two or more memories may be used according to particular needs, desires, or particular implementations of the computer 400 and the described functionality. While memory 414 is illustrated as an integral component of the computer 400, in alternative implementations, memory 414 can be external to the computer 400.

The application 416 is an algorithmic software engine providing functionality according to particular needs, desires, or particular implementations of the computer 400, particularly with respect to functionality described in this disclosure. For example, application 416 can serve as one or more components, modules, applications, etc. Further, although illustrated as a single application 416, the application 416 may be implemented as multiple applications 416 on the computer 400. In addition, although illustrated as integral to the computer 400, in alternative implementations, the application 416 can be external to the computer 400.

There may be any number of computers 400 associated with, or external to, a computer system containing computer 400, each computer 400 communicating over network 402. Further, the term "client," "user," and other appropriate terminology may be used interchangeably as appropriate without departing from the scope of this disclosure. Moreover, this disclosure contemplates that many users may use one computer 400, or that one user may use multiple computers 400.

Embodiments of the present disclosure may provide at least one of the following advantages.

The flex fuel natural gas-hydrogen concept disclosed herein may offer a viable path to introduce a common platform that leverages both hydrogen and natural gas infrastructure simultaneously while providing efficiencies and power output similar to diesel engines.

In some embodiments, a single mode combustion process may enable the combustion of natural gas-$H_2$ blends as well as the neat fuels under optimum conditions by leveraging the differences in laminar flame speed with respect to equivalence ratio.

In contrast to conventional flex fuel engines which may compromise operation for both fuels since they operate under stoichiometric condition, the use of varying lambda for each fuel type (e.g., hydrogen and natural gas) may be used to advantageously operate an engine system as disclosed herein across all fuel blends. By targeting a different target equivalence ratio for each fuel blend according to one or more embodiments disclosed herein, the differences in combustion properties may be properly accommodated, without requiring compromising performance at any given fuel blend as it would occur with stoichiometric engines (i.e., conventionally operated engines).

Embodiments disclosed herein relate to a lean combustion system which may result in higher engine efficiency for natural gas, hydrogen, and their blends and a robust method to determine refueling and the concentration of the blend in the tank, allowing the selection of the optimal calibration to be used.

EXAMPLES

Figure 5:
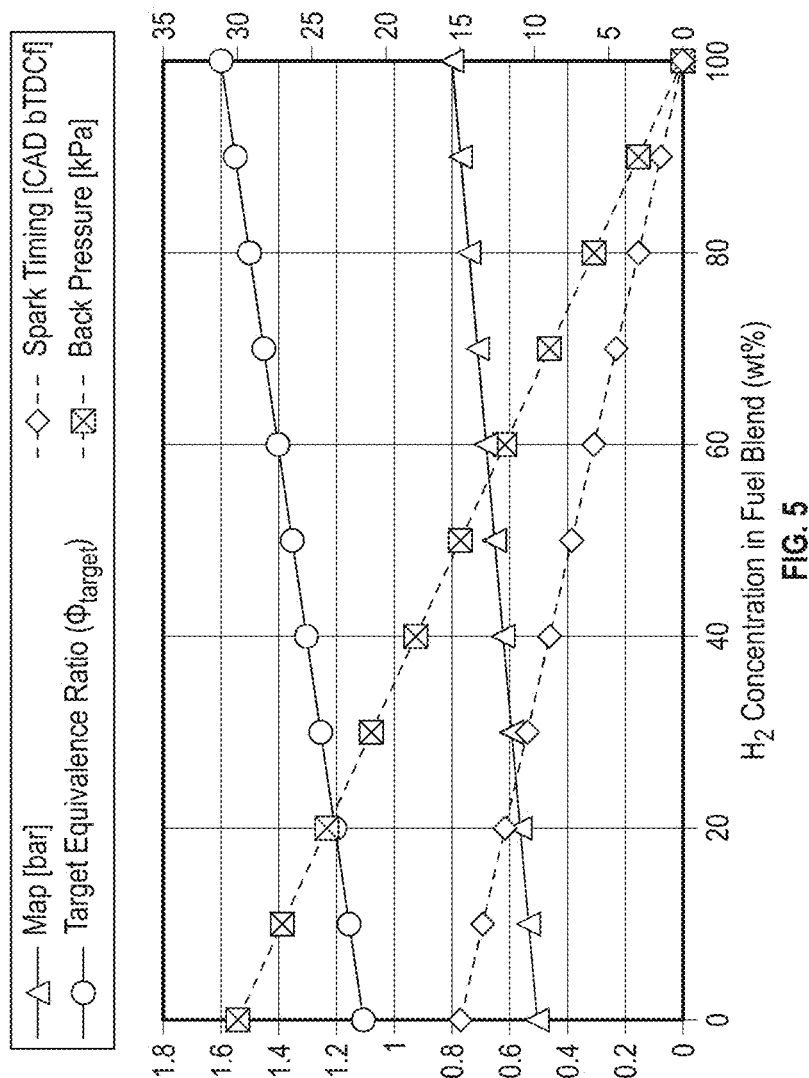
FIG. 5 shows fuel-engine relationships according to one or more embodiments.

FIG. 5 illustrates examples of fuel-engine relationships between engine operating conditions and hydrogen concentration in a fuel blend during cold start according to one or more embodiments disclosed herein. As shown in FIG. 5, the engine operating conditions include manifold air pressure (y-axis, lefthand side, units of "bar"), target equivalence ratio (y-axis, lefthand side, unitless), spark timing (y-axis, righthand side, crankshaft angle degrees (CAD) before top dead center firing (bTDCf)), and a back pressure (y-axis, righthand side, units of "kPa"). The manifold air pressure refers to a pressure of the air stream before entering the engine (e.g., the pressure of stream 112 in FIG. 1). From one or more relationships shown, an engine operation parameter may be optimized based on a determined $H_2$ concentration in the fuel blend used to fuel the engine. For example, when a fuel blend in an engine is determined to have a 40 wt. % $H_2$ concentration, the engine's intake manifold air pressure may be controlled to be around 0.6 bar, the spark timing may be set to about 8 degrees before top dead center, the engine's back pressure may be controlled to be around 18 kPa (e.g., by controlling one or more air handling system valves), and intake/exhaust valves and fuel injector may be controlled to reach a target equivalence ratio of about 1.3.

In one or more embodiments, the lambda line shown in FIG. 5 can be optimized depending on the intent of the engine and regulation to be compliant. For example, depending on the combustion system recipe, differences in lambda can be observed for a similar combustion output. Therefore, if a more demanding regulation for NOx, for example, is target, leaner lambdas may be used compared to a situation where power output and transient response are preferred.

Figure 6:
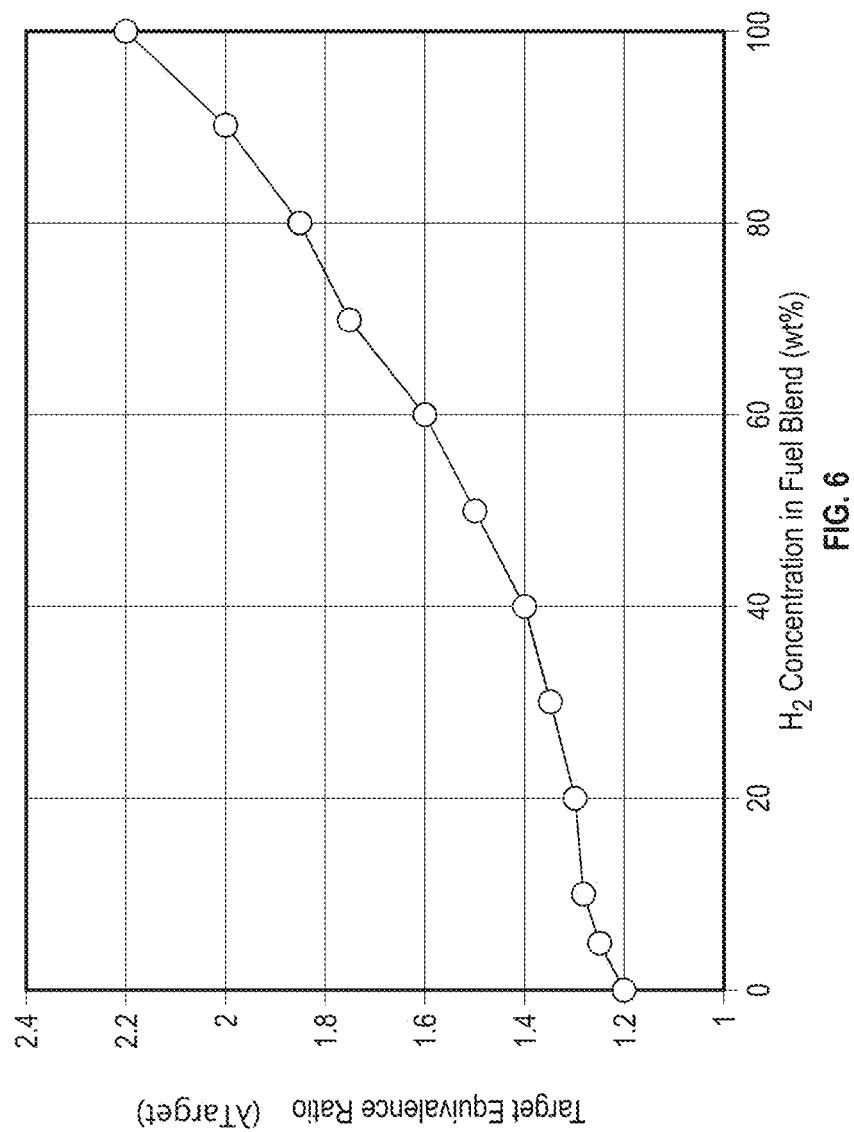
FIG. 6 is a second relationship according to one or more embodiments.

FIG. 6 illustrates a second example of fuel-engine relationships between global lambda target for engine operation after cold start and a hydrogen concentration in a fuel blend during cold start according to one or more embodiments disclosed herein. FIG. 6 shows a target equivalence ratio versus $H_2$ concentration in the fuel blend. The target equivalence ratio applies to engine operation after cold start ends.

Figure 7:
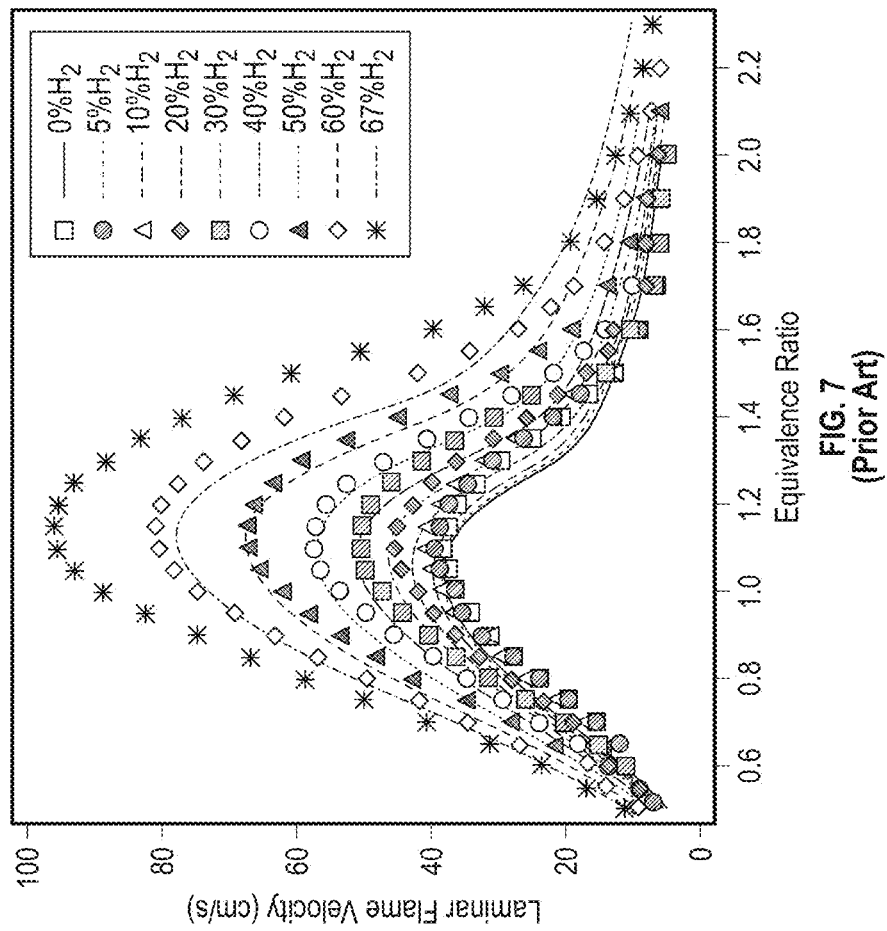
FIG. 7 shows an example of an equivalence ratio lookup chart.

A target equivalence ratio may be associated with a fuel blend having a determined composition, for example, using a target laminar flame speed and previously acquired correlation data between the laminar flame velocity and resulting equivalence ratio for the composition. For example, FIG. 7 illustrates an example of a compilation of previously acquired correlation data between the laminar flame velocity and resulting equivalence ratios for methane-$H_2$ fuel blend compositions with amounts of $H_2$ ranging from 0-67 wt. %. (Compiled by Patricia Dirrenberger, Hervé Le Gall, Roda Bounaceur, Olivier Herbinet, Pierre-Alexandre Glaude, et al. Measurements of Laminar Flame Velocity for Components of Natural Gas. Energy & Fuels 2011, 25 (9), pp. 3875-3884. ff10.1021/ef200707hff. ffhal-00776646.) An initial target laminar flame speed of 40 cm/s may be selected to achieve comparable combustion speeds as gasoline under stoichiometric conditions. A target equivalence ratio for pure natural gas fuel (comprising about 70-90% methane, with remaining composition of ethane, butane, propane, minor impurities, and/or additives) at a target laminar flame speed of 40 cm/s is about 1.2. As shown in FIG. 7, as the $H_2$ concentration is increased, a higher equivalence ratio is required to maintain the target laminar flame speed of 40 cm/s. In such manner, a target equivalence ratio for a determined fuel blend composition may be selected as a relationship for optimized engine operating parameters according to embodiments of the present disclosure.

Although only a few example embodiments have been described in detail above, those skilled in the art will readily appreciate that many modifications are possible in the example embodiments without materially departing from this invention. In addition, many modifications will be appreciated by those skilled in the art to adapt a particular instrument, situation, or material to embodiments of the disclosure without departing from the essential scope thereof. Accordingly, all such modifications are intended to be included within the scope of this disclosure as defined in the following claims.

Furthermore, the compositions described herein may be free of any component, or composition not expressly recited or disclosed herein. Any method may lack any step not recited or disclosed herein. Likewise, the term "comprising" is considered synonymous with the term "including." Whenever a method, composition, element, or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by one or more embodiments described herein. At the very least, and not as an attempt to limit the application of the doctrine of equivalents to the scope of the claim, each numerical parameter should at least be construed in light of the number of reported significant digits and by applying ordinary rounding techniques.

What is claimed:

1. A method, comprising:
    performing a fuel identification routine to determine a composition of a fuel blend at startup of an engine, wherein the fuel blend comprises an amount of hydrogen and an amount of natural gas;
    determining, using a fuel-engine relationship, target operating conditions corresponding to the composition of the fuel blend for operation of the engine, wherein the target operating conditions comprise a target air-fuel ratio;
    measuring, using an oxygen sensor disposed on a main exhaust passage of the engine, a residual oxygen concentration in an exhaust gas stream;
    calculating, from the residual oxygen concentration, an operating air-fuel ratio;
    adjusting one or more engine operating conditions, using a controller, until the operating air-fuel ratio equals the target air-fuel ratio,
    providing a pressure sensor located within a fuel storage system supplying the fuel blend to the engine;
    measuring a measured fuel pressure in the fuel storage system, using the pressure sensor, upon the startup of the engine and after re-fueling occurring at a time prior to the startup; and
    determining if the measured fuel pressure is greater than a fuel pressure at engine shutoff occurring at a time prior to re-fueling and prior to engine startup,
    wherein, when the measured fuel pressure is greater than the fuel pressure at engine shutoff, performing the fuel identification routine.

2. The method of claim 1, wherein the fuel-engine relationship relates the amount of hydrogen in the fuel blend to the target air-fuel ratio, a manifold air pressure, a spark timing, and a back pressure for the engine.

3. The method of claim 1, wherein calculating the operating air-fuel ratio comprises:
    measuring, using a mass air flow sensor located on a main intake passage, a mass flow rate of intake air entering the engine, wherein the intake air comprises recycled air and ambient air;
    measuring, using a mass fuel flow sensor located on a main fuel line fluidly connected to a fuel storage system, a mass flow rate of the fuel blend entering the engine during engine operation.

4. The method of claim 1, wherein performing the fuel identification routine further comprises:
    heating an amount of the fuel blend in a fuel reservoir located downstream of the fuel storage system by applying a voltage through a resistor disposed in the fuel reservoir, wherein the resistor is electrically connected to the controller and wherein a current sensor is disposed on the resistor;
    measuring, using a temperature sensor disposed in the fuel reservoir and electrically connected to the controller, a temperature of the fuel blend when the resistor reaches a steady state current;
    calculating a heat capacity of the fuel blend; and
    determining, using the controller, an amount of hydrogen and an amount of natural gas in the fuel blend based on the heat capacity of the fuel blend.

5. The method of claim 1, wherein performing the fuel identification routine further comprises:
    weighing an amount of fuel blend in a fuel reservoir located downstream of the fuel storage system using a scale located within the fuel reservoir, wherein the scale is in electrical communication with the controller;
    measuring a temperature and a pressure of the fuel blend in the fuel reservoir using a temperature sensor and a pressure sensor disposed in the fuel reservoir, wherein the temperature sensor and the pressure sensor are electrically connected to the controller;
    calculating a density of the fuel blend using the ideal gas law; and
    determining, using the controller, an amount of hydrogen and an amount of natural gas in the fuel blend based on the density of the fuel blend.

6. A system, comprising:
    a fuel storage system fluidly connected to an engine by a main fuel line;
    a pressure sensor connected to the fuel storage system;
    an air handling system fluidly connected to a downstream side of the engine by a main exhaust passage;
    a main intake passage fluidly connected to an upstream side of the engine;

an oxygen sensor interfacing with the main exhaust passage; and a controller electrically coupled to the engine and the oxygen sensor, the controller including a processor and a memory, the memory storing instructions that, when executed by the processor, cause the processor to:

perform a fuel identification routine to determine a composition of a fuel blend in the fuel storage system at startup of the engine, wherein the fuel blend comprises an amount of hydrogen and an amount of natural gas;

determine, using a fuel-engine relationship, target operating conditions corresponding to the composition of the fuel blend for operation of the engine, wherein the target operating conditions comprise a target air-fuel ratio;

use the oxygen sensor to measure a residual oxygen concentration in an exhaust gas stream in the main exhaust passage;

calculate, from the residual oxygen concentration, an operating air-fuel ratio;

adjust one or more engine operating conditions until the operating air-fuel ratio equals the target air-fuel ratio;

measure, using the pressure sensor, a measured fuel pressure of the fuel blend upon engine startup and after re-fueling occurring at a time prior to engine startup; and determine if the measured fuel pressure is greater than a fuel pressure at engine shutoff occurring at a time prior to re-fueling and prior to engine startup, wherein, when the measured fuel pressure is greater than the fuel pressure at engine shutoff, performing the fuel identification routine.

7. The system of claim 6, further comprising:

a mass air flow sensor disposed on the main intake passage, configured to measure a mass flow rate of an air intake stream entering the main intake passage;

a mass fuel flow sensor disposed on the main fuel line configured to measure a mass flow rate of the fuel blend in the main fuel line;

at least one sensor in the air handling system of the engine.

8. The system of claim 7, wherein the controller is further configured to calculate the operating air-fuel ratio by:

measuring, using the mass air flow sensor, the mass flow rate of air entering the engine;

measuring, using the mass fuel flow sensor, the mass flow rate of the fuel blend entering the engine during engine operation.

9. The system of claim 6, wherein the engine comprises:

an engine block comprising a cylinder;

a piston configured to move up and down inside a main chamber of the cylinder; and a fuel injector mounted to the engine block and in fluid communication with the main chamber, wherein the fuel storage system is fluidly connected to the fuel injector, wherein the main intake passage is fluidly connected to the main chamber via an intake valve provided on the engine block, and wherein the main chamber is fluidly connected to the main exhaust passage via an exhaust valve provided on the engine block.

10. The system of claim 6, wherein the controller is further configured to:

perform the fuel identification routine by:

receiving, from a temperature sensor disposed in a fuel reservoir and electrically connected to the controller, a temperature of a fuel blend in the fuel reservoir when a resistor reaches a steady state current, wherein the fuel reservoir located downstream of the fuel storage system and is heated by applying a voltage through the resistor disposed in the fuel reservoir, wherein the resistor is electrically connected to the controller and wherein a current sensor is disposed on the resistor;

calculating a heat capacity of the fuel blend; and determining an amount of hydrogen and an amount of natural gas in the fuel blend based on the heat capacity of the fuel blend.

11. The system of claim 6, wherein the controller is further configured to:

perform the fuel identification routine by;

receiving a weight of an amount of fuel blend in a fuel reservoir located downstream of the fuel storage system from a scale located within the fuel reservoir, receiving a temperature and a pressure of the fuel blend in the fuel reservoir from a temperature sensor and a pressure sensor disposed in the fuel reservoir, calculating a density of the fuel blend using the ideal gas law, and determining an amount of hydrogen and an amount of natural gas in the fuel blend based on the density of the fuel blend.

* * * * *